United States Patent Office 3,102,302
Patented Sept. 3, 1963

3,102,302
LEVER ARM ACTUATED EXTRUSION
DIE ADJUSTER
Edward J. Moore, Tonawanda, N.Y., assignor to E. I. du Pont de Nemours and Company, Wilmington, Del., a corporation of Delaware
Filed Sept. 25, 1961, Ser. No. 140,453
3 Claims. (Cl. 18—12)

This invention relates to a lever-arm adjustment mechanism, and more particularly to a mechanism especially adapted for the precise adjustment of an adjustable orifice lip of a film extrusion apparatus.

The improvement in gauge uniformity of films and sheets is the subject of continuing effort in the industry. A critical step of the manufacturing process is extrusion; hence, much effort has been directed to improvements in extrusion adjustment apparatus. Adaptation of extruder control to automation enables more precise control of gauge, but is limited by deficiencies of existing extrusion apparatus, which was at best a modification of apparatus initially designed for manual control. For example, due to the forces involved, the high torque required for direct-acting screw-adjusted die lips is not consistent with the best design for automatic control systems. Further, with direct-acting screw adjusters the requirements for very fine threads for fine adjustments is often undesirable. Consequently, adjusters employing a lever-arm arrangement have been employed. For various reasons these lever-arm devices are not completely adequate in solving the problem of attaining a mechanized means of controlling the extrusion die orifice. Some designs have adjuster screws which are inaccessible to motor drive. Another design has a pair of screws acting in opposition to drive the lever in each direction; such an arrangement is not readily adapted to motor drive. Still another design employs the wedging action of a tapered screw to move the lips; tapered screws have inherently high friction due to the wedging action and the lack of perfect fit which results from the changing radius of curvature. In some devices employing a lever-arm design the fulcrum is integral with the lip, which causes a complex warping of the lip structure upon adjustment, with an inordinately high force requirement, and considerable interaction between separate adjusters. Since the essential edge of a lip often is submerged in an aqueous chemical bath, some adjusters are not useable due to the presence of elements in which there are rotating bearings in a position which would be submerged with the lip. Finally, as devices become more complex, backlash prevents precise adjustments.

It is an object of this invention to provide an improved mechanism which permits the precise, rapid and positive adjustment of mechanical elements.

A further object is to provide a lever-arm adjustment mechanism for use in flat film extrusion dies which (1) permits the use of a lip having only an orifice-defining function, (2) permits greater freedom and flexibility in lip design and (3) enables the reduction of interaction between separate adjusters. These and other objects will appear hereinafter.

These and other objects of this invention are accomplished by providing, in combination, a U-shaped body member; an adjustable lip slideably fixed to the body member; a rigid lever-arm having two openings therein; a stud fixedly attached to and projecting from the adjustable lip into the first opening, the stud fixing the lip to the lever-arm; a bendable support member fixedly attached to the body member and lever-arm, the member forming a fulcrum about which the lever-arm pivots; a threaded cylindrical stud attached to and projecting from the body member into the second opening; a nut having a skirt provided internally with threads, the nut and skirt being in threaded engagement with the threads of the stud; and spring means between the body member and lever-arm adapted to maintain a constant contact between the threads of the nut and skirt and the stud.

This invention employs a spring-loaded, rigid lever-arm attached to an adjustable lip, the lever-arm capable of independently bending the lip to finely and precisely control the contour of the extrusion orifice. Fine adjustment is attained by theoretical mechanical advantage of the lever-arm; precision is attained by the use of spring loading to eliminate backlash. The absence of a load carrying function in the lip permits more freedom in lip design, such as a relatively flexible, slideable lip.

Used herein are certain terms which have specific meanings, which, while they are within the scope of common usage, are defined here with regard to specific limitations in this invention.

The word "backlash" is used in the sense of play or movement of connected parts resulting from looseness of fit and essential clearance; it is apparent as a lack of response and insensitivity of the entire mechanism to slight movements of any element of the adjusting apparatus.

"Theoretical mechanical advantage" is defined as the ratio of the distance moved by the lever-arm at the adjusting screw to the distance moved by the essential edge of the adjustable lip.

"Rigid" as applied to the lever-arm means relatively unyielding and not flexed by combined forces required to bend the lip, to pivot the lever on the support, and to distort the loading spring.

"Bend" as applied to the adjustable lip means to strain from its usual unstrained condition by force applied by the adjusting mechanism to vary the contour of the orifice which the lip partly defines.

"Flexible" as applied to the support member means that this member is capable of bending or being distorted to allow the rigid lever-arm to pivot, but essentially unyielding in the direction radial to the pivoting motion.

"Lever of the first class" is the structure in which the fulcrum formed by the support member is between the adjusting screw and the bendable lip, such that the motion of the lever-arm adjusting screw is in the opposite direction from the motion of the adjustable lip.

"Lever of the second class" is the structure in which the adjustable lip is attached to the lever-arm between the support member, which serves as a fulcrum, and the adjusting screw, such that the motion of the lever-arm adjacent to the adjusting screw is in the same direction to the motion of the adjustable lip.

Details of the apparatus will become apparent in the following description, reference being had to the accompanying drawings, wherein.

Figure 1:
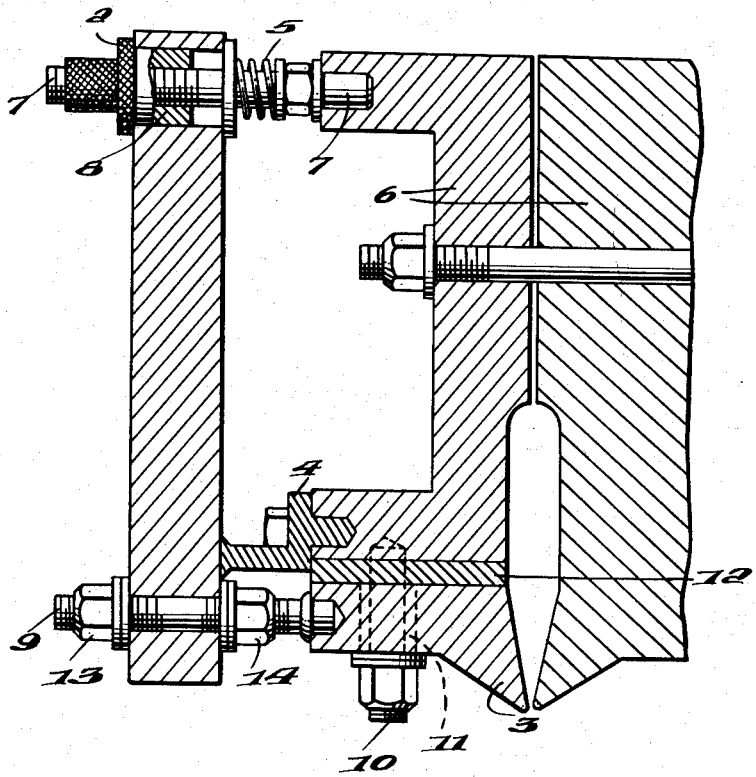
FIGURE 1 is an end view, partly sectional, illustrative of the apparatus showing, in part, a slideable adjustable lip with a lever-arm of the first class.

In operation, referring to the figures, the adjusting screw 2 comprised of a nut and internally threaded skirt is driven by a suitable means (not shown) over threads 8 of fixed stud 7 to move rigid lever-arm 1 in the appropriate direction to effect the desired movement of adjustable lip 3. The motion of lever-arm 1 at adjusting screw 2 is transmitted as motion of lesser displacement to bendable lip 3 by pivoting of lever-arm 1 around the fulcrum formed by support member 4. Loading spring 5 is arranged to maintain compressive contact between lever-arm 1 and the threads of stud 7 which is rigidly fixed to hopper body 6, the upper portion of which is U-shaped, in order to eliminate backlash and provide immediate and positive response at bendable lip 3 to rotation of adjusting screw 2. Shown in the figures is an adjustable lip 3, which is affixed in a slideable manner to hopper body 6 by stud 10; an elongated channel 11 provides for the opening and closing motion of the lip. Spacer 12 provides for reduced friction and assists in forming a seal between lip 3 and hopper body 6. The lip is affixed rigidly by stud 9 to lever-arm 1. Gross adjustments of the lip opening may be made by nuts 13 and 14.

Spring 5 which maintains constant contact between the same thread faces of the nut and skirt of adjuster screw 2 and stud 7 in order to eliminate backlash, must have sufficient capacity to flex the support member and bend the adjustable lip. Shown in the figures is an axially mounted coil spring; however, axially mounted disc springs of a frustro-conical configuration (Belleville type) are preferred. A cantilever spring between the lever-arm 1 and the body section 6 can be employed.

The lever-arm permits the use of an adjusting screw of relatively coarse pitch, since the mechanical advantage reduces relatively coarse movements of the lever-arm at the adjusting screw to relatively fine movements of the lip. Shown in the figures is a simple screw, having stud 7 threadably engaging the nut and skirt of the screw as shown at 8 which drives the lever-arm 1 toward the body section 6 upon appropirate rotation by the skirt of the adjusting screw. Reversal of the direction of rotation of the adjustment screw causes the lever-arm 1 to be moved in the opposite direction under force provided by spring 5.

Figure 2:
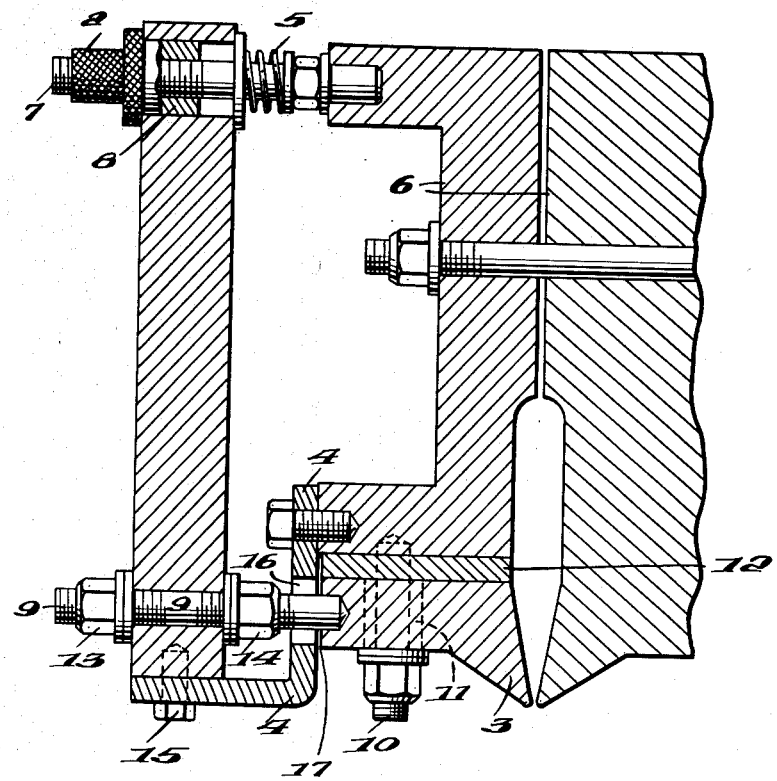
FIGURE 2 is an end view partly sectional, illustrative of the apparatus showing, in part, a slideable adjustable lip with a lever-arm of the second class.

Under most conditions the structure illustrated in FIGURE 1, employing a lever of the first class, is quite satisfactory. However, under some conditions it is desirable to use the structure shown in FIGURE 2, with a lever of the second class, since it has been found more convenient for increasing the theoretical mechanical advantage in a confined space. The support member 4, extends beyond the lip 3, and is attached to the end of the lever-arm 1 by cap screw 15. Opening 16 is slightly larger than stud 9 to permit free movement of the stud as the lip is adjusted. A gap 17 is maintained between lip 3 and support 4 to permit the desired travel of the lip.

A number of adjusters are arranged along the adjustable lip of the extrusion hopper according to the requirement for control. For the extrusion of viscose in the production of cellophane, 18 adjusters and an 88-inch hopper have been used. Adjustments are effected by reversible electric motors which can be controlled manually or by an automatic device such as disclosed in U.S. Patents 2,790,945 and 2,829,268.

The length and design of the lever-arm and support determines the load required of the spring and the torque required to effect adjustments of the lip. The torque requirement is an important consideration in automatic control where low torque, high speed motors are desirable.

Materials of construction for the various components are those known to the art to provide required rigidity, flexibility and corrosion resistance.

The invention described applied directly to a die for flat extrusion as normally employed for extrusion of viscose in cellophane manufacture, but, within the scope of the apparatus described, it could be employed with appropriate modifications to other die configurations for viscose and other materials.

Example

With reference to FIGURE 1, typical operating characteristics are: the spring 5 loads the threads of screw 2 with 1200 pounds force. A turn of the adjustable screw 2 over the threads 8 causes a motion of 0.0084 inch of the lever arm at the screw. The lever-arm pivots at 4 with a 7:1 ratio and reduces the motion to 0.0012 inch at the lip 3.

The apparatus described in this invention has several distinct advantages over apparatus previously available. First of all, compared to direct-acting screw-adjusted lips, this invention possesses the advantage of finer control as a result of the leverage.

Secondly, compared to other devices with a lever-arm, this invention possesses several advantages. It has the advantage of a simple, single screw design, easily adapted to motor drive, with lower friction than tapered screw adjusters. The adjuster screw is readily accessible for motor drive. The separate bendable support member, which serves as a fulcrum, enables greater flexibility of lip design. Since the lip has no support function, it floats and may have greater flexibility with less interaction between adjusters. It should be observed that the operation of this lip adjustment apparatus causes bending of the lip in substantially one plane only, which results in a minimum of interaction between adjacent adjusters. Careful analysis of the forces involved in the operation of other adjusters known to the art which employ a lever arm reveals that in order to vary the lip opening, the lip structure must be warped out of a plane, with complex stresses which tend to produce greater interaction between adjacent sets of adjusters. Accordingly, this invention requires relatively less power, and is capable of greater precision of adjustment.

A further advantage of this apparatus is the feature that there are no rotating parts in the lower end, which, under some conditions, is operated submerged in an aqueous bath. The benefit to be derived is evident when the inability to effectively lubricate the system without contamination of the bath is considered.

Finally, the use of spring loading at the maximum length of the lever-arm to eliminate backlash and drive the lever in one direction enables the use of a lower capacity spring.

What is claimed is:

1. An adjustment mechanism comprising, in combination, a body member; an adjustable lip slideably fixed to said body member; a rigid lever-arm having one end fixedly attached to said adjustable lip and having an opening at the opposite end; a bendable support member fixedly attached to said body member and said lever-arm, said member forming a fulcrum about which said lever-arm pivots; a threaded cylindrical stud projecting from said body member in alignment with said opening and screw operated, spring loaded driving means for said lever arm mounted on said stud.

2. An adjustment mechanism comprising, in combination, a U-shaped body member; an adjustable lip slideably fixed to the lower end of said body member; a rigid lever-arm having two openings therein; a stud fixedly attached to and projecting from said adjustable lip into said first opening, said stud fixing said lip to said lever-arm; a bendable support member fixedly attached to said body member and said lever-arm, said member forming a lever of the first class; a threaded cylindrical stud attached to and projecting from said body member into said second opening; a nut having a skirt provided internally with threads, said nut and skirt in threaded engagement with the threads of said stud; and spring means mounted on said stud between said body member and said lever-arm; adapted to maintain a constant contact between the threads of said nut and skirt and said stud.

3. An adjustment mechanism comprising, in combination, a U-shaped body member; an adjustable lip slideably fixed to the lower end of said body member; a rigid lever-arm having two openings therein; a stud fixedly attached to and projecting from said adjustable lip into said first opening, said stud fixing said lip to said lever-arm; a bendable support member fixedly attached to said body member and the end of said lever-arm, said member forming a lever of the second class; a threaded cylindrical stud attached to and projecting from said body member into said second opening; a nut having a skirt provided internally with threads, said nut and skirt in threaded engagement with the threads of said stud; and spring means mounted on said stud between said body member and said lever-arm, adapted to maintain a constant contact between the threads of said nut and skirt and said stud.

References Cited in the file of this patent

UNITED STATES PATENTS 2,765,492     Velvel ------------------ Oct. 9, 1956